United States Patent
Dong et al.

(10) Patent No.: US 8,705,405 B2
(45) Date of Patent: Apr. 22, 2014

(54) METHOD AND SYSTEM FOR OBTAINING A DEPLOYMENT SCHEME OF WIRELESS LOCAL AREA NETWORK ACCESS POINTS

(75) Inventors: Mingjie Dong, Shenzhen (CN); Wei Zhang, Shanghai (CN); Yuan Zhou, Shenzhen (CN); Yun Hu, Shenzhen (CN); Shoubao Yang, Shenzhen (CN); Shen Hu, Shenzhen (CN); Guanbo Hou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 251 days.

(21) Appl. No.: 13/339,259

(22) Filed: Dec. 28, 2011

(65) Prior Publication Data

US 2012/0099481 A1   Apr. 26, 2012

Related U.S. Application Data

(63) Continuation of application No. PCT/CN2010/078147, filed on Oct. 27, 2010.

(30) Foreign Application Priority Data

Oct. 27, 2009 (CN) .......................... 2009 1 0110374

(51) Int. Cl.
*H04L 12/28* (2006.01)
(52) U.S. Cl.
USPC ...... 370/254; 370/252; 455/456.1; 455/456.5
(58) Field of Classification Search
USPC ............... 370/255, 254, 252, 334; 455/456.1, 455/456.5, 404.2, 561, 562.1, 422.1
See application file for complete search history.

(56) References Cited

U.S. PATENT DOCUMENTS

| | | |
|---|---|---|
| 6,973,622 B1 | 12/2005 | Rappaport et al. |
| 7,035,642 B2 | 4/2006 | Rappaport et al. |
| 7,085,697 B1 | 8/2006 | Rappaport et al. |
| 2004/0143428 A1 | 7/2004 | Rappaport et al. |
| 2005/0059405 A1 | 3/2005 | Thomson et al. |
| 2005/0245252 A1 | 11/2005 | Kappes et al. |
| 2007/0082677 A1* | 4/2007 | Hart et al. ................. 455/456.1 |
| 2007/0117567 A1 | 5/2007 | Rappaport et al. |
| 2007/0147255 A1 | 6/2007 | Oyman |
| 2009/0043666 A1 | 2/2009 | Malik et al. |

FOREIGN PATENT DOCUMENTS

| | | |
|---|---|---|
| CN | 1691624 A | 11/2005 |
| CN | 101310488 A | 11/2008 |
| CN | 101442754 A | 5/2009 |
| WO | WO 2005/029277 A2 | 3/2005 |

OTHER PUBLICATIONS

Written Opinion of the International Searching Authority dated Feb. 10, 2011 in connection with International Patent Application No. PCT/CN2010/078147.

(Continued)

*Primary Examiner* — Dady Chery

(57) ABSTRACT

A method for obtaining a deployment scheme of Wireless Local Area Network (WLAN) Access Points (APs) is provided. The method includes obtaining coverage information of each AP according to a WLAN competition model and deployment information; and combining a constraint relationship between the coverage information of each AP and cost information of each AP, and obtaining the deployment scheme of the APs through calculation. A device and a system are further provided, so as to automatically obtain a deployment scheme of APs, and control the cost.

20 Claims, 9 Drawing Sheets

---

S10 — Obtain coverage information of each AP according to a WLAN competition model and deployment information S20 — Combine a constraint relation between the coverage information of each AP and cost information of each AP, and obtain the deployment policy of the APs through calculation

(56) References Cited

OTHER PUBLICATIONS

Li Man-Iin, Wen, et al., "Automatic GSM Network Planning System Based on Cost Control", Mini-Micro Systems, vol. 25, No. 7, Jul. 2004, 4 pages.

International Search Report dated Feb. 10, 2011 in connection with International Patent Application No. PCT/CN2010/078147.

Michael Joham, et al., "MMSE Approaches to Multiuser Spatio-Temporal Tomlinson-Harashima Precoding," Institute for Circuit Theory and Signal Processing, Munich University of Technology, 8 pages.

IEEE Standard for Information technology—Telecommunications and information exchange between systems—Local and metropolitan area networks—Specific requirements—Part 11: Wireless LAN Medium Access Control (MAC) and Physical Layer (PHY) Specification, IEEE Computer Society, IEEE Std 802.11—2007 (Revision of IEEE Std 802.11-1999), 1232 pages.

Supplementary European Search Report dated Mar. 19, 2012 in connection with European Patent Application No. EP 10 82 6084.

Matthias Unbehaun, et al., "On the Deployment of Picocellular Wireless Infrastructure", IEEE Wireless Communications, Dec. 2003, p. 70-80.

\* cited by examiner

METHOD AND SYSTEM FOR OBTAINING A DEPLOYMENT SCHEME OF WIRELESS LOCAL AREA NETWORK ACCESS POINTS

CROSS-REFERENCE TO RELATED APPLICATIONS

This application is a continuation of International Application No. PCT/CN2010/078147, filed on Oct. 27, 2010, which claims priority to Chinese Patent Application No. 200910110374.8, filed on Oct. 27, 2009, both of which are hereby incorporated by reference in their entireties

TECHNICAL FIELD

The present invention relates to the field of communications, and in particular, to a method and a system for obtaining a deployment scheme of Wireless Local Area Network (WLAN) Access Points (APs).

BACKGROUND

As the WLAN represented by the IEEE 802.11 protocol provides a good solution for access to the Internet and Intranet, the WLAN has rapidly developed at present. As wireless terminals such as a notebook computer, a Personal Digital Assistant (PDA) and an intelligent mobile phone become popular, APs of the WLAN are dramatically increased. Due to the continuous increase of the APs, a planning mechanism needs to be properly deployed, so as to avoid the disadvantages such as decrease of the overall network performance and poor manageability caused by random deployment.

In the prior art, the characteristics of the WLAN APs, for example, the number of the APs, deployment positions, and configuration of the APs, may be determined according to the input floor planning data, coverage data, and capacity data. The floor planning data is some construction factors such as a size and a topology, AP configuration such as positions and AP attributes such as power and channels. The coverage data is the characteristics of the WLAN APs at all floor positions, including a connection rate, a coverage area, and a transmission rate. The capacity data corresponds to a throughput of the APs, which may be determined according to the number of corresponding active terminals. Finally, the corresponding AP configuration (for example, positions, and AP attributes such as power and channels) are determined and emulated in a computer based on the three types of data.

In the prior art, the AP configuration is determined through manual adjustment, including deployment positions of the APs, and power and channels used by the APs, and therefore the cost becomes limitless.

SUMMARY

Embodiments of the present invention provide a method and system for obtaining a deployment scheme of WLAN APs, so as to automatically obtain the deployment scheme of the APs, and control cost.

According to an aspect of the present invention, a method for obtaining a deployment scheme of WLAN APs includes:
obtaining coverage information of each AP according to a WLAN competition model and deployment information; and
combining a constraint relationship between the coverage information of each AP and cost information of each AP, and obtaining the deployment scheme of the APs through calculation.

According to another aspect of the present invention, a system for obtaining and validating a deployment scheme of WLAN APs includes:
a device for obtaining a deployment scheme of WLAN APs, configured to obtain coverage information of each AP according to a WLAN competition model and obtained deployment information, combine a constraint relationship between the coverage information of each AP and cost information of each AP, and obtain the deployment scheme of the APs through calculation; and
a validation device, configured to validate the access requirement of the deployment scheme of the APs.

In the technical solutions according to the embodiments of the present invention, the coverage information of the AP is obtained according to the WLAN competition model and the deployment information, a constraint relationship between the coverage and the cost information of the AP is combined, and the deployment scheme of the APs is calculated, so that the AP deployment can be achieved without participation of manpower, and a constraint relationship between the cost information of each AP and the coverage of each AP is combined, so as to control the cost required by the overall deployment.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

Figure 1:
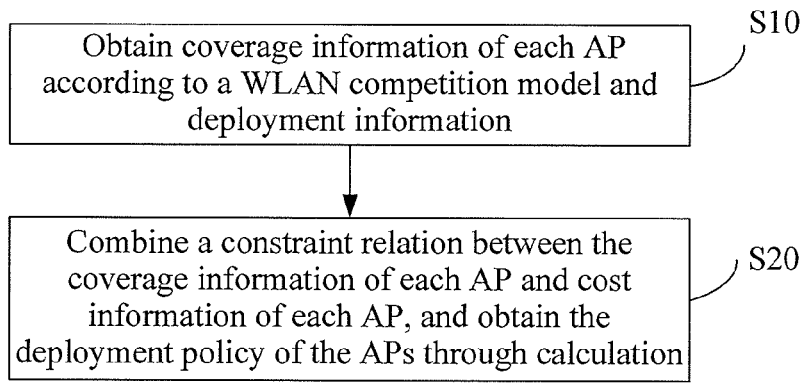
FIG. 1 is an overall flow chart of a method for obtaining a deployment scheme of WLAN APs according to an embodiment of the present invention.

FIG. 1 is an overall flow chart of a method for obtaining a deployment scheme of WLAN APs according to an embodiment of the present invention.

Step S10: Obtain coverage information of each AP according to a WLAN competition model and deployment information.

Step S20: Combine a constraint relationship between the coverage information of each AP and cost information of each AP, and obtain the deployment scheme of the APs through calculation.

Figure 1A:
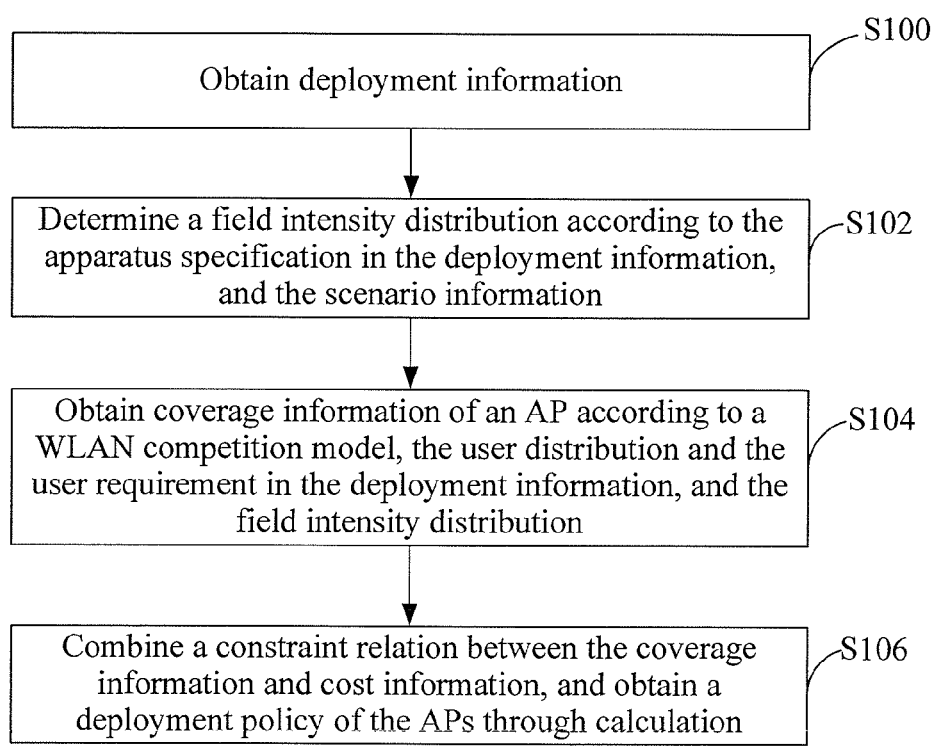
FIG. 1A is a detailed flow chart of FIG. 1 according to an embodiment of the present invention.

FIG. 1A is a detailed flow chart of FIG. 1 according to an embodiment of the present invention. This embodiment includes the following steps. Step S100: Obtain deployment information. In this embodiment, the deployment information includes scenario information, apparatus specification information of multiple APs, a transmission model, user distribution information, and user requirement information. In this embodiment, the scenario information is an area to be covered by the deployment, including length, width, and height information of the area, information of obstacles in the area, and attenuation factor information of the obstacles. The apparatus specification information is apparatus configuration information of APs deployed in the scenario, including information such as the number of radio frequencies, types, working frequency bands, cost or prices, and power. The user distribution information is position information of users in the given scenario, and may be understood as position information of terminals in the given scenario in this embodiment. The user requirement information is information such as rates and bandwidths of users at given positions in the given scenario.

In step S100, a rectangular mesh topology may be determined according to the scenario to be deployed. Alternatively, it can be understood that the area to be covered is described with a rectangular mesh topology, in which a status of each grid in the mesh topology may be idle or obstacle. As numerous different obstacles may exist in the area, the status of the grid may be obstacle 1, obstacle 2, and so on. In this embodiment, the status of the grid may also be described with a numerical value, for example, if numerical value information in a grid is 0, it indicates that the grid has no obstacle, or is idle; and if the numerical value information in the grid is 1, it indicates that the grid has an obstacle being obstacle 1, and the rest may be deduced by analogy.

Definitely, the number of the obstacles in the mesh topology may be further obtained by the statuses of the grids.

In step S100, whether each grid has a terminal and a size of a bandwidth required by the grid are determined according to the user distribution, the user requirement and the mesh topology. In this embodiment, it is determined whether each grid has a terminal according to the position information of the terminals in the scenario in the user distribution and the mesh topology; and the size of the bandwidth required by the grid is determined according to the position information of the terminals in the scenario in the user distribution, the bandwidth information of the terminals in the scenario in the user requirement, and the mesh topology. As in this embodiment, a corresponding relationship is also formed between a signal attenuation value and the bandwidth requirement, the mesh topology may be determined by the scenario. Therefore, it can be understood that, the signal attenuation value may be obtained by the user distribution, the user requirement and the scenario.

In step S100, different transmission models may be selected according to different scenarios.

Step S102: Determine a field intensity distribution according to the apparatus specification and the scenario information in the deployment information. In this embodiment, as the APs have multiple apparatus specifications, the field intensity distribution of each AP may be determined according to each apparatus specification and the scenario information in the deployment information.

In this embodiment, as in step S100, a rectangular mesh topology may be determined according to the scenario to be deployed, and different transmission models may be selected according to different scenarios. Therefore, in step S102, the signal attenuation value between any two grids may be calculated by the selected transmission model, and then the field intensity distribution of each grid is obtained through weighted calculation of the power in the apparatus specification and the signal attenuation value, or it can be understood that the field intensity distribution from the AP to each grid is obtained. In this embodiment, the field intensity distribution may also be referred to as signal intensity. In this embodiment, a corresponding relationship is also formed between the signal attenuation value and the bandwidth requirement. Therefore, the signal attenuation value may be obtained through the bandwidth requirement and the corresponding relationship, or the bandwidth requirement may be obtained through the signal attenuation value and the corresponding relationship.

Step S104: Obtain coverage information of an AP according to a WLAN competition model, the user distribution and the user requirement in the deployment information, and the field intensity distribution. In this embodiment, as the APs have multiple apparatus specifications and the field intensity distribution of each AP is obtained in step S102, in step S104, the coverage information of each AP is obtained according to the WLAN competition model, the user distribution and the user requirement in the deployment information, and the field intensity distribution of each AP, that is, the coverage information of multiple APs is obtained. In this embodiment, the WLAN competition model is also known as a WLAN competition mechanism.

Step S106: Combine a constraint relationship between the coverage information and cost information, and obtain a deployment scheme of the APs through calculation. In this embodiment, a constraint relationship between the coverage information of each AP and the cost information of each AP is combined, and the deployment scheme of the APs with the lowest cost is obtained through calculation.

Figure 2:
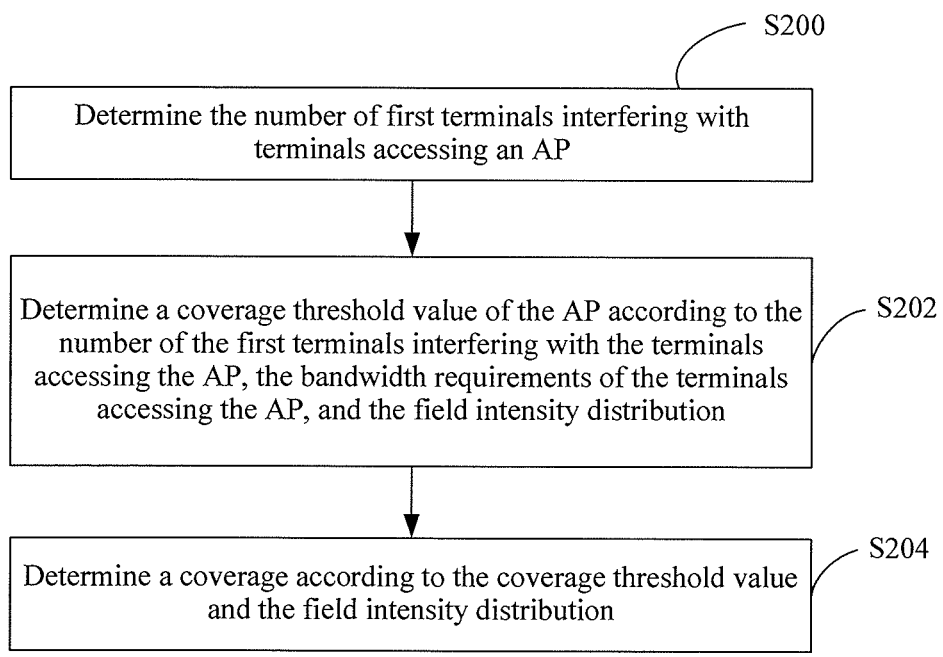
FIG. 2 is a flow chart of specific implementation of step S104 in FIG. 1A according to an embodiment of the present invention.

FIG. 2 is a flow chart of specific implementation of step S104 in FIG. 1A according to an embodiment of the present invention. In this embodiment, description is made with reference to the obtaining of an AP having a certain apparatus specification among the APs having multiple apparatus specifications. Step S200: Determine the number of first terminals interfering with terminals accessing an AP. In this embodiment, the number of the first terminals interfering with the terminals accessing the AP may be determined according to the WLAN competition model, the number of terminals accessing the AP, and the number of terminals in an interference range of the AP. In this embodiment, the number of the terminals in the interference range of the AP includes two parts. One part is the number of terminals in a 1× interference range of the AP and the other part is the number of terminals in a 2× interference range of the AP, in which the interference range may be determined by a power and an attenuation degree of the AP. The interference range can be understood and obtained by persons skilled in the art. In this embodiment, the WLAN competition model may be a capacity model of a single or multiple WLAN APs established according to competition degeneration mechanism conditions such as the number and rate of terminals working on the same channel, and may be expressed by an inequation below:

$$\sum_{sta_i \in STA(n1)} \frac{d_{sta_i}}{b_{sta_i}} \leq \left(\frac{n1}{n}\right)^\alpha (1 - \text{Cost}(n)).$$

In this embodiment, $\alpha$ is an adjustment parameter, and may have different values. $d_{sta_i}$ represents a bandwidth requirement of a terminal i accessing an AP. $b_{sta_i}$ represents a maximum bandwidth requirement from the terminal i accessing the AP to the AP, in which the maximum bandwidth requirement from the terminal i to the AP may be understood as a maximum bandwidth provided by the AP for the terminal i, that is, a maximum field intensity distribution from the AP to a grid in which the terminal accessing the AP resides. n represents the number of the first terminals interfering with the terminals accessing the AP. Cost(n) represents a competition overhead. n1 represents the number of the terminals accessing the AP.

When $\alpha$ has different ranges, a value of the number of the first terminals interfering with the terminals accessing the AP is influenced. The following formulas exist:

if $\alpha < 1, n = n1/(n1/n2)^\alpha$; and if $\alpha \geq 1, n = n1/(n1/n3)^{\alpha-1}$, where n represents the number of the first terminals interfering with the terminals accessing the AP, n1 represents the number of the terminals accessing the AP, n2 represents the number of the terminals in the 1× interference range of the AP, and n3 represents the number of the terminals in the 2× interference range of the AP. In this embodiment, if a satisfactory deployment scheme is not obtained when $\alpha$ is smaller than 1, the value of $\alpha$ may be set to 1, and then the deployment scheme is obtained.

Step S202: Determine a coverage threshold value of the AP according to the number of the first terminals interfering with the terminals accessing the AP, the bandwidth requirement of the terminals accessing the AP, and the field intensity distribution. In this embodiment, a competition overhead may be determined according to the number of the first terminals interfering with the terminals accessing the AP; and then the coverage threshold value of the AP is determined according to the competition overhead, the bandwidth requirement of the terminals, and the field intensity distribution.

Step S204: Determine coverage according to the coverage threshold value and the field intensity distribution. In this embodiment, coverage of the AP for each grid is determined according to the coverage threshold value of the AP and the field intensity distribution of each grid. In this embodiment, a three-dimensional matrix C[i,j,g] may be used to represent a coverage for a grid j of an AP with a g apparatus specification and located in a grid i, in which g represents the apparatus specification of the AP, or represents a type of the AP. In this embodiment, as there are APs of multiple apparatus specifications, there is the coverage of multiple APs.

Figure 3:
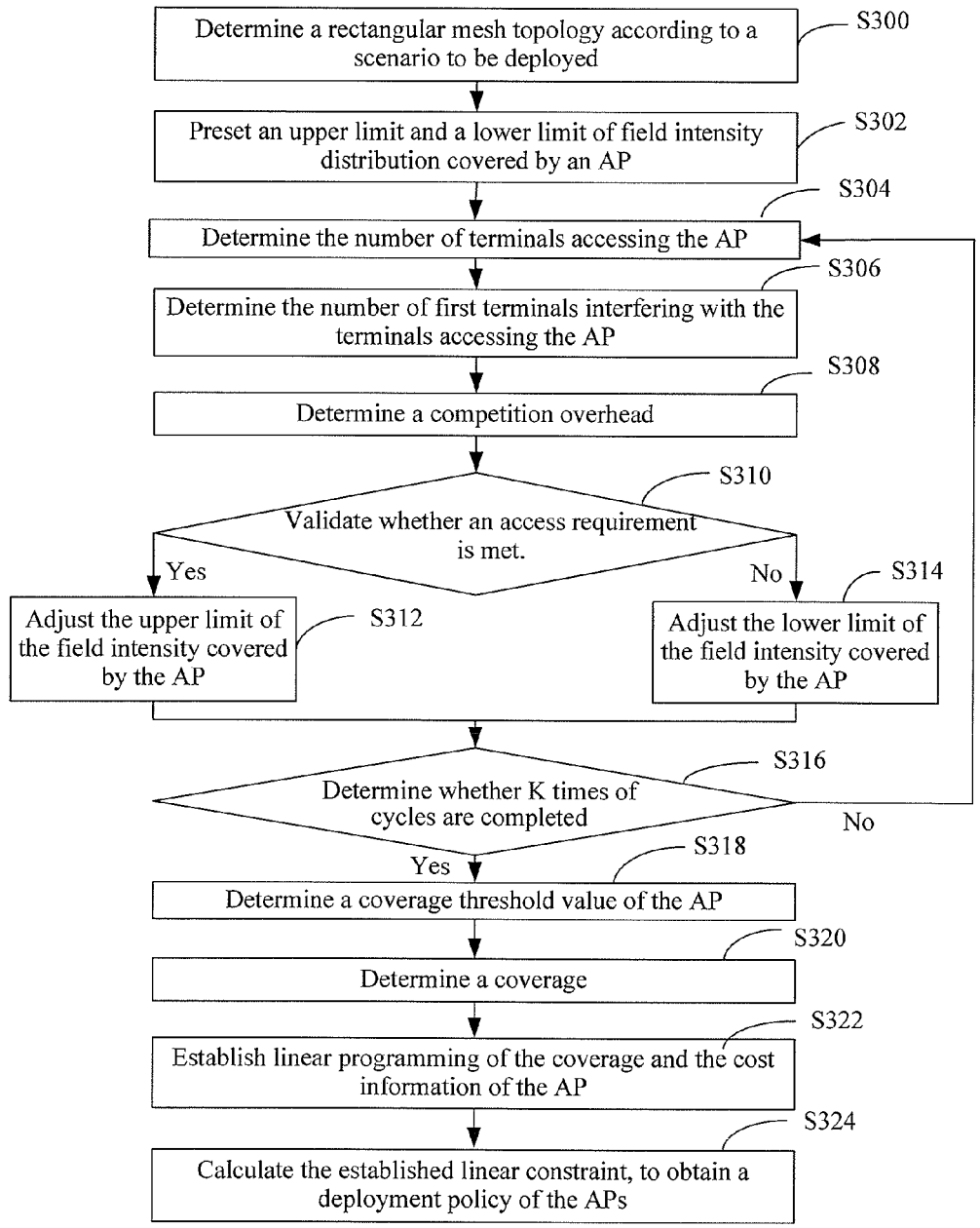
FIG. 3 is a flow chart of specific implementation of a method for obtaining a deployment scheme of WLAN APs according to an embodiment of the present invention.

FIG. 3 is a flow chart of specific implementation of a method for obtaining a deployment scheme of WLAN APs according to an embodiment of the present invention.

This embodiment includes the following steps. Step S300: Determine a rectangular mesh topology according to a scenario to be deployed.

Step S302: Preset an upper limit and a lower limit of field intensity distribution covered by an AP. In this embodiment, the upper limit of the field intensity may be preset to be a numerical value greater than or equal to a signal transmission power of the AP, and the lower limit of the field intensity may be preset to be smaller than or equal to a minimum intensity value of a signal received by a terminal from the AP.

Step S304: Determine the number of terminals accessing the AP. In this embodiment, it can be understood that the number of the terminals accessing the AP is determined by adjusting the upper limit and the lower limit of the field intensity covered by the AP, and according to user distribution and user requirement in deployment information. In this embodiment, the upper limit or the lower limit of the field intensity covered by the AP refers to the field intensity coverage of the AP residing in one grid for all other grids. Definitely, whether a grid has a terminal must be determined first, and it is then determined whether the terminal accesses the AP. In this embodiment, it is determined whether each grid has a terminal according to the user distribution and the mesh topology. In addition, the number of the terminals accessing the AP may be determined according to a bandwidth requirement of the terminal in each grid and an average value of the upper limit and the lower limit of the field intensity covered by the AP. In this embodiment, a terminal in a grid having a bandwidth requirement greater than the average value is used as a terminal accessing the AP, so the number of the terminals in all grids with a bandwidth requirement greater than the average value needs be collected, and the collected number of terminals is the number of the terminals accessing the AP. In this embodiment, the average value of the upper limit and the lower limit of the field intensity of the grid may be represented by (the upper limit of the field intensity+the lower limit of the field intensity)/2.

Step S306: Determine the number of first terminals interfering with the terminals accessing the AP. In this embodiment, the number of the first terminals interfering with the terminals accessing the AP may be determined according to a WLAN competition model, the number of the terminals accessing the AP, and the number of terminals in an interference range of the AP. In this embodiment, the number of the terminals in the interference range of the AP includes two parts. One part is the number of terminals in a 1× interference range of the AP and the other part is the number of terminals in a 2× interference range of the AP, in which the interference range may be determined by a power and an attenuation degree of the AP. It can also be understood that, the number of the terminals in the interference range includes the number of the terminals accessing the AP, and the number of terminals capable of receiving signals transmitted from the AP but incapable of accessing the AP. The interference range can be understood and obtained by persons skilled in the art.

In this embodiment, $\alpha$ may have different values. When $\alpha$ has different ranges, a value of the number of the first terminals interfering with the terminals accessing the AP is influenced. In this embodiment, the value of $\alpha$ may start from 0. The following formulas exist:

if $\alpha < 1, n = n1/(n1/n2)^\alpha$; and if $\alpha \geq 1, n = n1/(n1/n3)^{\alpha-1}$, in which n represents the number of the first terminals interfering with the terminals accessing the AP, n1 represents the number of the terminals accessing the AP, n2 represents the number of the terminals in the 1× interference range of the AP, and n3 represents the number of the terminals in the 2× interference range of the AP.

Step S308: Determine a competition overhead. In this embodiment, the competition overhead may be determined according to the number of the first terminals interfering with the terminals accessing AP.

In this embodiment, n represents the number of the first terminals interfering with the terminals accessing the AP, and Cost(n) represents the competition overhead. In this embodiment, a model may be established through the WLAN competition characteristics, the WLAN competition characteristics are expressed in the form of a saturated throughput, and the saturated throughput refers to an effective time ratio for data transmission per unit of time, and may be represented by a formula below:

$$S = \frac{P_s P_{tr} E[P]}{(1-P_{tr})\sigma + P_{tr} P_s T_s + P_{tr}(1-P_s)},$$

in which $$P_{tr} = 1 - (1-\tau)^n$$

$$P_s = n\tau(1-\tau)^{n-1}/(1-(1-\tau)^n)$$

$$\tau = \frac{2}{W+1}$$

S is a ratio of time for transmitting valid data/(time for transmitting valid data+competition waiting time+competition conflict generation time), E [P] represents an average size of packet payload, δ represents a transmission delay, $T_s$ represents a detected average time caused by a busy channel (a busy time slot) due to the successful transmission, $T_c$ represents average time of a busy channel detected by each terminal during a conflict, that is, sending RTSσ represents duration of an empty time slot, $P_{tr}$ represents a probability of sending by at least one terminal in a given time slot, $P_s$ represents a probability of successful sending of a data packet on a channel, τ represents an occurrence probability of sending of data by a terminal in a randomly selected time slot, and n represents the number of the first terminals interfering with the terminals accessing the AP. In this embodiment, an overhead 1-S caused by competition may be obtained according to a definition of the saturated throughput, that is, Cost(n) is 1-S. In this embodiment, as the value of the number of the first terminals interfering with the terminals accessing the AP is influence when α has different ranges, and the value of n influences the deployment cost, a corresponding relationship is formed between the value of α and the deployment cost, and the lower the value of α is, the lower the deployment cost is.

Step S310: Validate whether the AP meets an access requirement. In this embodiment, whether the access requirement is met is validated according to the competition overhead, the bandwidth requirements of the terminals accessing the AP, and the field intensity distribution from the AP to the grids in which the terminals accessing the AP reside. In this embodiment, it can be understood that the access requirement may include two aspects. One aspect is that a deployed network needs to meet a certain throughput, and the other aspect is that a rate or a wideband rate of each terminal in the deployed network needs to be met. In this embodiment, whether the access requirement is met can be validated by judging whether an inequation below is true. If the inequation is true, it is validated that the access requirement is met. If the inequation is false, it is validated that the access requirement is not met. The inequation is as follows:

$$\sum_{sta_i \in STA(n1)} \frac{d_{sta_i}}{b_{sta_i}} \leq \frac{n1}{n}(1-\text{Cost}(n))$$

in which, $d_{sta_i}$ represents a bandwidth requirement of a terminal accessing the AP, $b_{sta_i}$ represents a maximum bandwidth requirement from the terminal i accessing the AP to the AP, in which the maximum bandwidth requirement from the terminal i to the AP may be understood as a maximum bandwidth provided by the AP for the terminal i, that is, a maximum field intensity distribution from the AP to a grid in which the terminal accessing the AP resides; n represents the number of the first terminals interfering with the terminals accessing the AP, Cost(n) represents the competition overhead, and n1 represents the number of the terminals accessing the AP.

In this embodiment, when the inequation is true, it is validated that the access requirement is met, and step S312 is performed. When the inequation is false, it is validated that the access requirement is not met, and step S314 is performed.

Step S312: Adjust the upper limit of the field intensity covered by the AP. In this embodiment, a new upper limit of the field intensity is adjusted to be an average value of the original upper limit of the field intensity and the original lower limit of the field intensity.

Step S314: Adjust the lower limit of the field intensity covered by the AP. In this embodiment, a new lower limit of the field intensity is adjusted to be the average value of the original upper limit of the field intensity and the original lower limit of the field intensity.

After step S312 or S314 is performed, step S316 is performed.

Step S316: Determine whether K times of cycles are completed. It can be understood that in step 316, it is determined whether the first preset times of cycles are completed, and the first preset times of cycles are the K times of cycles. In this embodiment, after each cycle, the value of K is decreased by 1. In this embodiment, it can be understood that in step 316, it is determined whether the value of K is 0. In this embodiment, if the value of K is not 0, K times of cycles are not completed, and step S304 is performed, that is, the first preset times of cycles of steps S304 to S314 are performed. In this case, the average value of the upper limit and the lower limit of the field intensity of the grid in step S304 is also correspondingly updated. If the value of K is 0, the K times of cycles are completed, and step S318 is performed.

Step S318: Determine a coverage threshold value of the AP. In this embodiment, it can be understood that the coverage range of the AP is determined. In this embodiment, after the K times of cycles are completed, the adjusted upper value of the field intensity is used as the coverage threshold value of the AP.

Step S320: Determine coverage. In this embodiment, the coverage is determined according to the coverage threshold value and the field intensity distribution. In this embodiment, the coverage of the AP for each grid is determined according to the coverage threshold value of the AP and the field intensity distribution of each grid. In this embodiment, a three-dimensional matrix C[h,j,g] may be used to represent coverage for a grid j of an AP with a g apparatus specification and located in a grid h, in which g represents the apparatus specification of the AP, or represents a type of the AP. In this embodiment, the coverage in three cases is included. In the first case, if an AP is located in a grid h, a field intensity distribution of the AP for a grid j is greater than a coverage threshold value, and the grid j does not belong to an edge area covered by the grid h, C[h,j,g] is C0, and C0 is an edge coverage requirement, in which the edge area is a term well known to persons skilled in the art, and is not further described herein again. In a second case, if the AP is located in the grid h, the field intensity distribution of the AP for the grid j is greater than the coverage threshold value, and the grid j belongs to an edge area covered by the grid h, and C[h,j,g] is 1. In a third case, if the AP is located in the grid h, and the field intensity distribution of the AP for the grid j is smaller than the coverage threshold value, C[h,j,g] is 0.

In this embodiment, the coverage of the AP may also be represented by capacity coverage areas or field intensity coverage areas at different positions. A mapping relationship may exist between the coverage of the AP and the capacity coverage area or the field intensity coverage area. In this embodiment, the AP is located in a certain grid, and if it is met that the coverage is greater than or equal to a certain threshold value, it is considered that the AP at the position can cover capacity areas required by all STAs in the range of the threshold value. In this embodiment, the threshold value may be 2. In contrast, if a capacity coverage range of an AP at a certain position is known, and the capacity of the AP at the position is smaller than a product range of the capacity coverage range and the threshold value, it is considered that the coverage of the AP is a, and if the capacity of the AP at the position is greater than the product range of the capacity coverage range and the threshold value, it is considered that the coverage of the AP is b.

Likely, in this embodiment, the AP is located in a certain grid, if it is met that the coverage is greater than or equal to a certain threshold value, it is considered that the AP at the position can cover the field intensity areas or the signal intensity areas required by all the STAs in the range of the threshold value. In this embodiment, the threshold value may be 2. In contrast, if a field intensity coverage range of an AP at a certain position, and the field intensity of the AP at the position is smaller than a product range of the field intensity coverage range and the threshold value, it is considered that the coverage of the AP is b, and if the field intensity of the AP at the position is higher than the product range of the field intensity coverage range and the threshold value, it is considered that the coverage of the AP is a.

Step S322: Combine a constraint relationship between the coverage information of each AP and cost information of each AP. In this embodiment, the constraint relationship between the coverage of each AP and the cost information of each AP may be described through linear programming, or the constraint relationship between the coverage of each AP and the cost information of each AP may also be described through graph theory. Definitely, a simplex algorithm in operational research may also be used. In this embodiment, as for the constraint relationship in which each grid h needs to meet Sum(isThere(j,g)*C(h,j,g))>=coverageDegree(h), and coverage Degree(h) refers to a coverage required by the grid h. In this embodiment, when the constraint relationship is met, a target function is established according to the cost information of each AP apparatus with a g apparatus specification. The target function is [totalcost]min=Sum(cost(g)*isThere(h,g)), that is, a sum of the prices of all apparatuses to be deployed is the minimum, so that the deployment cost reaches the minimum. In this embodiment, after each grid h meets the constraint relationship of the coverage, the deployment cost brought by the APs having the same apparatus specification is obtained in the presence of such a constraint, and then related information of the APs with the minimum deployment cost is obtained. In this embodiment, it can be understood that, the APs having the same apparatus specification not only need to meet the constraint relationship of the coverage, but also need to meet the constraint relationship of the cost. In this embodiment, more linear constraint may be selected to be established; however, this is only an optional scheme. Establishment of the constraint relationship between the coverage and the cost information of the AP is an essential scheme. For example, an apparatus position linear constraint is established. In this embodiment, a position constraint of the APs is established. The apparatuses are located in grids in state 0, that is, each grid h needs to meet the condition of isThere(h,g)*gridstatus(h)=0, in which isThere(h,g) represents that an apparatus with a type of g is located in the grid h, gridstatus(h) represents whether the grid h has an apparatus, the value is 1 if the grid h has an apparatus, and the value is 0 if the grid has no apparatus. A gateway position liner constraint may be further established. In this embodiment, each gateway position d needs to meet Sum(isThere(d,g))=1.

In this embodiment, the constraint relationship between the coverage and the cost information of the AP may be described through the graph theory as follows.

Figure 3A:
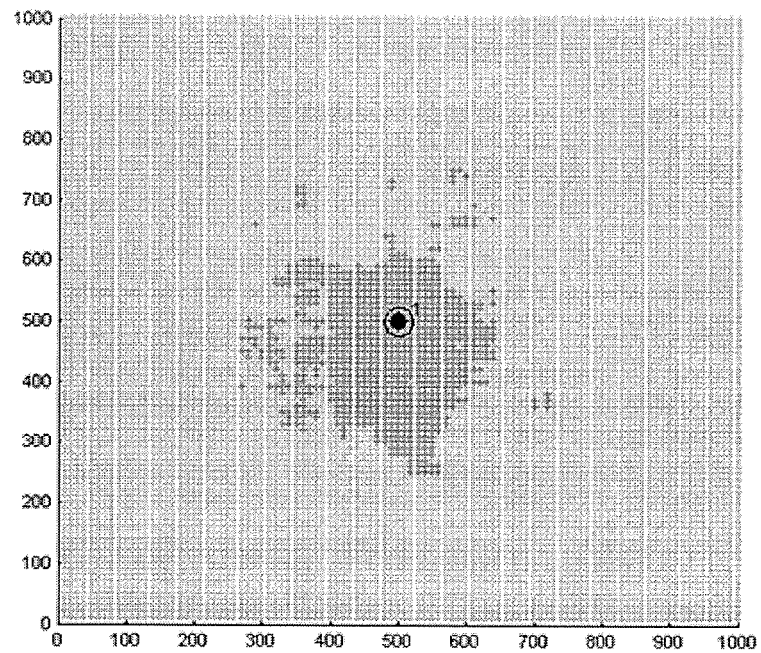
FIG. 3A is a coverage area diagram of APs in step AA according to an embodiment of the present invention.

Step AA: Deploy an AP at a certain point, and obtain a coverage area graph of the AP. In step AA, it can be understood that, if a top point of the graph is understood as a node of the AP, each AP has a certain capacity range or signal coverage range. Reference may be made to AP node 1 in FIG. 3A.

Figure 3B:
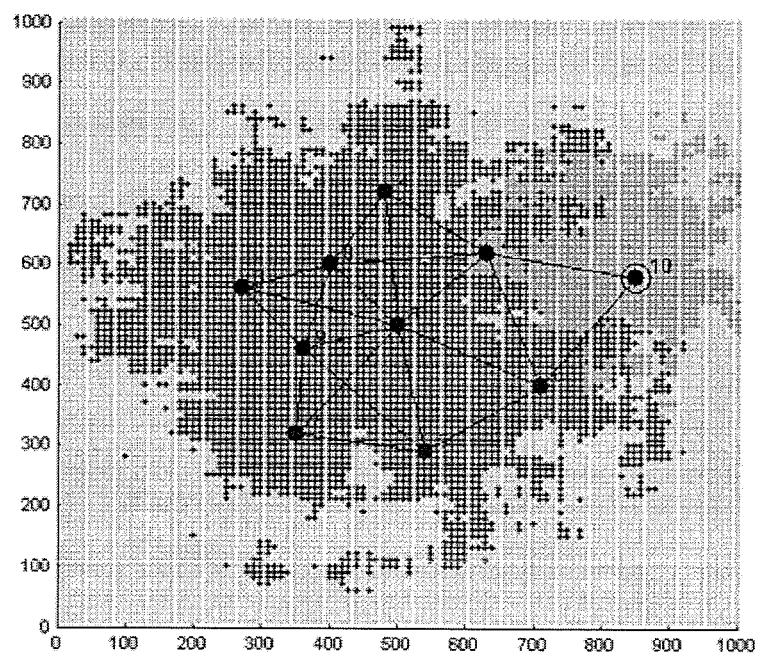
FIG. 3B is a coverage area diagram of APs in step BB according to an embodiment of the present invention.

Step BB: Select peripheral nodes for deployment, and maximize an area jointly covered by the nodes. In this step, after an area capable of being met by a first node is determined, positions of the following AP nodes are found by using a greedy method according to a full coverage requirement, that is, all points in the scenario are covered by a radio signal or each point meets a certain rate. After the node positions are deployed, the minimum number of APs is achieved, that is, the minimum cost of the entire network is achieved. Reference may be made to AP nodes 1 to 10 in FIG. 3B.

Figure 3C:
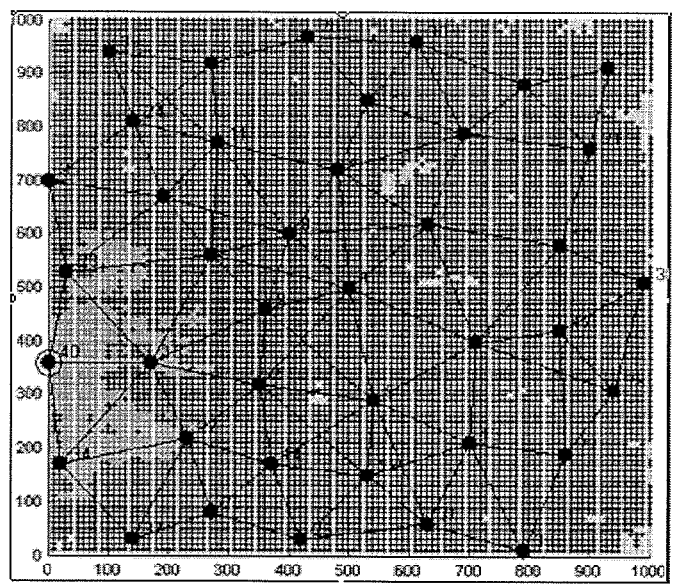
FIG. 3C is a coverage area diagram of APs in step CC according to an embodiment of the present invention.

Step CC: Perform iteration following the rule in step BB, until the entire area is covered or meets a certain rate requirement. Reference may be made to AP nodes 1 to 40 in FIG. 3C.

Step S324: Calculate the established constraint to obtain an deployment scheme of the APs with a minimum total deployment cost. In this embodiment, the deployment scheme includes the positions of the APs, the bandwidth requirement, the coverage range, the field intensity distribution to each grid, and the cost. In this embodiment, each AP has a constraint relationship, after each grid h meets the constraint relationship of the coverage, the deployment cost brought by the APs having the g apparatus specification is obtained in the presence of such a constraint, and then the deployment scheme of the APs with the minimum deployment cost is obtained. The deployment scheme may further include the WLAN competition model used in step S306, that is, the value of α.

In the method for obtaining the deployment scheme of the WLAN APs according to the embodiment, the number of the first terminals interfering with the terminals accessing the AP is determined according to the obtained deployment information, the coverage threshold value of the AP is obtained according to the number of the first terminals, the bandwidth requirements of the terminals accessing the AP, and the field intensity distribution, the coverage is obtained according to the coverage threshold value and the field intensity distribution, and the constraint is established according to the cost information of the apparatus and the coverage, so as to obtain the deployment scheme of the WLAN APs. Compared with the prior art, no manual adjustment is required in obtaining of the deployment scheme of the WLAN APs, so that automatic obtaining of the deployment scheme of the APs can be achieved. In obtaining of the deployment scheme of the WLAN APs, the constraint between the cost information of each AP and the coverage of the each AP is established, so that the cost needed by the entire deployment can be controlled, and the deployment scheme of the APs with the minimum total deployment cost is obtained.

Figure 4:
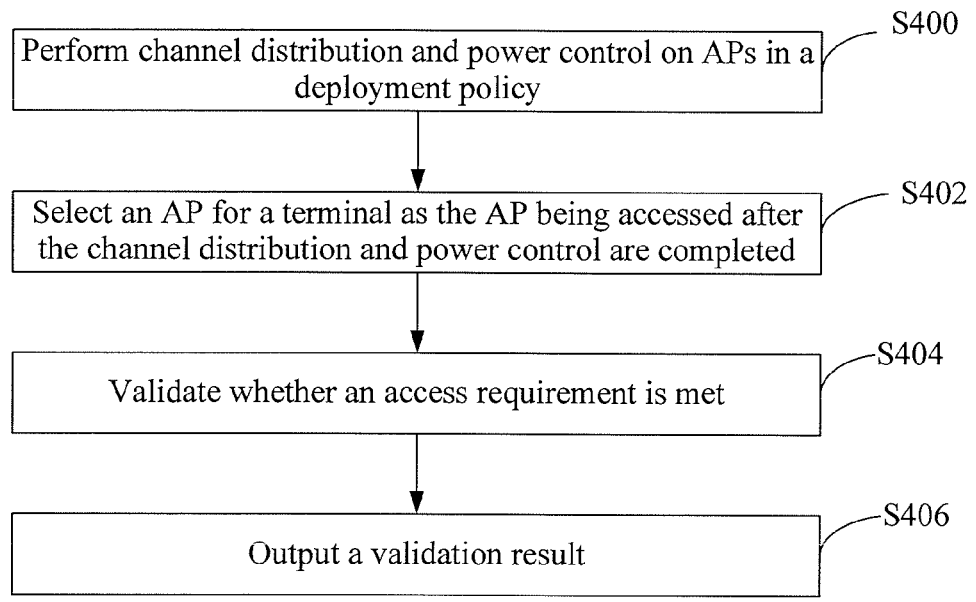
FIG. 4 is a flow chart of a method for validating a deployment scheme of APs according to an embodiment of the present invention.

FIG. 4 is a flow chart of a method for validating a deployment scheme of APs according to an embodiment of the present invention. In this embodiment, the deployment scheme output by the method in FIG. 3 is validated, and deployment schemes of the APs output by other deployment methods may also be validated.

Step S400: Perform channel distribution and power control on APs in a deployment scheme.

Step S402: Select an AP for a terminal as the AP being accessed after the channel distribution and power control are completed.

Step S404: Validate whether an access requirement is met. In this embodiment, in case that the validation is directed to the deployment scheme output by the method in FIG. 3, when it is validated that the access requirement is met, the deployment scheme passing the validation is saved first, and it is determined whether a current competition index is 0, if the current competition index is 0, the deployment scheme passing the validation is output, and if the current competition index is not 0, the competition index is adjusted, and the process returns to step S306 in FIG. 3. When it is validated that the access requirement is not met, the current competition index is adjusted, and the process returns to step S306 in FIG. 3. Definitely, in this process, times of cycles v need to be set, when v reaches a preset value, the saved deployment scheme is output. Definitely, when no deployment scheme is saved, a result of no deployment scheme is output. In this embodiment, in case that the validation is directed to the deployment schemes of the APs output by other deployment methods, if it is validated that the access requirement is met, the deployment schemes are directly output. If it is validated that the access requirement is not met, a result of incorrect or unsuccessful deployment schemes is output.

Step S406: Output a validation result. In this embodiment, the deployment scheme of the APs passing the validation is output, or an incorrect or unsuccessful result is output.

Figure 5:
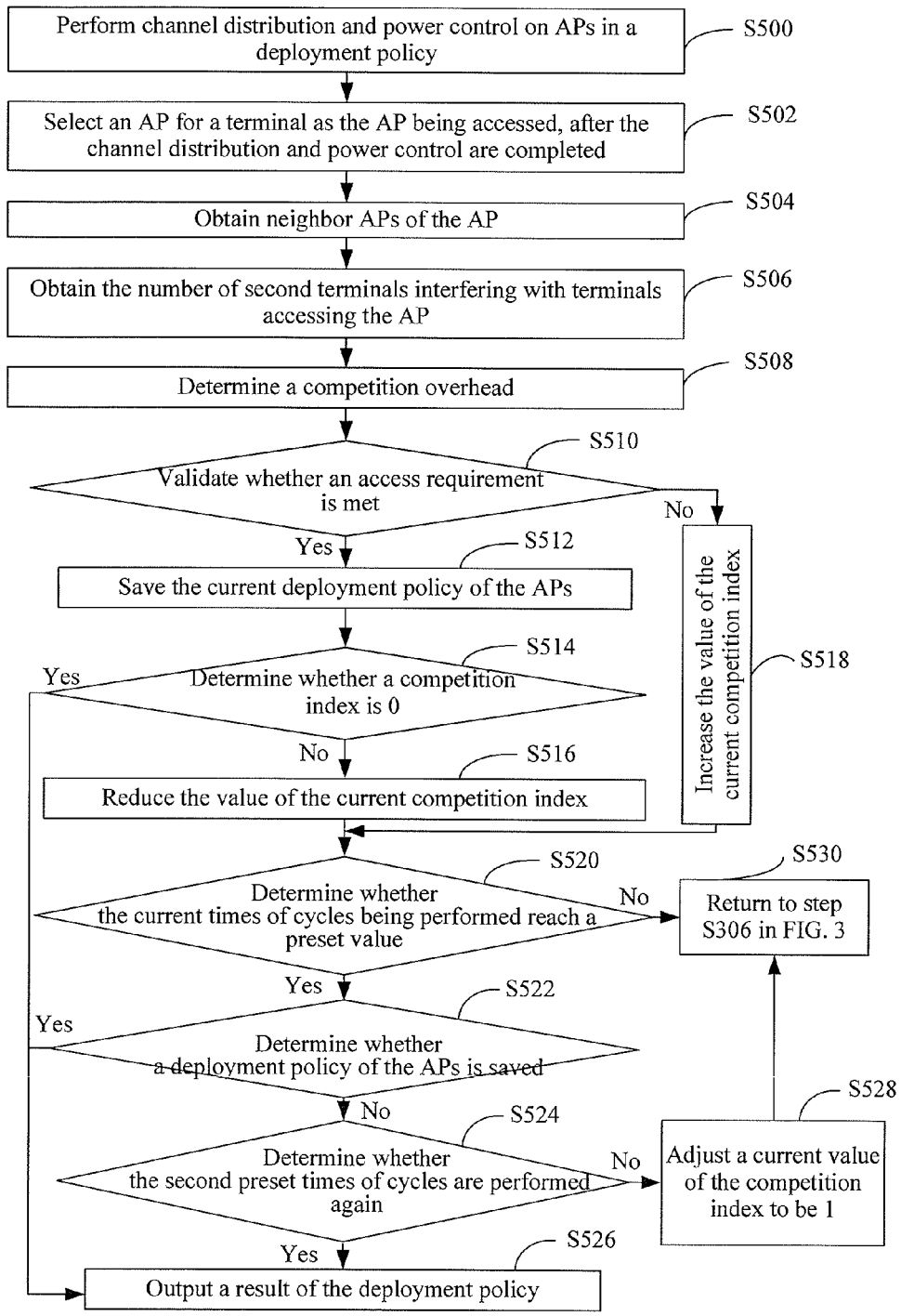
FIG. 5 is a specific flow chart of a method for validating a deployment scheme of APs in a first case according to an embodiment of the present invention.

FIG. 5 is a specific flow chart of a method for validating a deployment scheme of APs in a first case according to an embodiment of the present invention.

Step S500: Perform channel distribution and power control on APs in a deployment scheme. In this embodiment, the channel distribution may be performed on the APs in the deployment scheme by using any channel distribution algorithm, and the power control may be performed on the APs in the deployment scheme by using any power control algorithm. In this embodiment, the channel distribution algorithm is mainly to select a channel with a minimum signal intensity for each AP as a working channel according to a collected signal intensity scanned for the APs in the entire network, and the power control algorithm is mainly to turn down the power of one or more APs according to interference information of APs in the entire network, in which a coverage requirement must be ensured in the turn-down process.

Step S502: Select an AP for a terminal as the AP being accessed, after the channel distribution and power control are completed. In this embodiment, any AP selection algorithm may be used to select an AP for a terminal as the AP being accessed. The AP selection algorithm is mainly that the terminal selects whether to access the AP according to a received AP signal intensity, and a payload of the AP, in which the terminal selects multiple APs based on the signal intensities first, and then selects an AP with a minimum payload to be accessed according to the payloads of the APs.

Step S504: Obtain neighbor APs of the AP. In this embodiment, all neighbor APs working on the same channel with the AP are obtained in an interference range of the AP.

Step S506: Obtain the number of second terminals interfering with terminals accessing the AP. In this embodiment, the number of terminals accessing all the neighbor APs of the AP and the number of terminals accessing the AP are obtained first, and the number of the terminals accessing all the neighbor APs of the AP and the number of the terminals accessing the AP are weighed to obtain the number of the second terminals interfering with the terminals accessing the AP. In this embodiment, as in steps S500 and S502, the processes of channel distribution, power control and AP selection are performed, the number of the terminals actually accessing the AP and the number of the second terminals interfering with the terminals accessing the AP are obtained. However, different from the number of the first terminals interfering with the terminals accessing the AP in FIG. 3, the number of the first terminals in FIG. 3 is a result obtained with continuous debug deployment, and varies momentarily, and the number of the second terminals may be considered as an actual result.

Step S508: Determine a competition overhead. In this embodiment, the competition overhead may be determined according to the number of the second terminals interfering with the terminals accessing the AP. In this embodiment, reference may be made to the overhead computation method in FIG. 3.

Step S510: Validate whether the AP meets an access requirement, that is, perform the validation. In this embodiment, whether the access requirement is met is validated according to the competition overhead, the bandwidth requirements of the terminals accessing the AP, and the field intensity distribution from the AP to the grids in which the terminals accessing the AP reside. In this embodiment, reference may be made to the validation method in FIG. 3. In this embodiment, when it is validated that the access requirement is met, step S512 is performed. If it is validated that the access requirement is not met, step S518 is performed.

Step S512: Save the current deployment scheme of the APs. After saving the current deployment scheme of the APs, step S514 is performed.

Step S514: Determine whether a competition index is 0. In this embodiment, as in step S306 shown in FIG. 3, the value of the competition index in the WLAN competition model may be set in the process of determining the number of the first terminals interfering with the terminals accessing the AP according to the WLAN competition model, the number of the terminals accessing the AP, and the number of the terminals in the interference range of the AP, and in step S514, the value of the competition index needs to be validated. If the value of the competition index is not 0, step S516 is performed. If the value of the competition index is 0, step S526 is performed.

Step S516: Reduce the value of the current competition index. In this embodiment, current times of cycles d being performed are obtained, that is, the times of step S510 being performed are obtained, and the value of the competition index is reduced by $\frac{1}{2}^{d-1}$.

Step S518: Increase the value of the current competition index. In this embodiment, the current times of cycles d being performed are obtained, that is, the times of step S510 being performed are obtained, and the value of the competition index is increased by $\frac{1}{2}^{d-1}$.

After steps S516 or S518 is performed, step S520 is performed.

Step S520: Determine whether the current times of cycles being performed reach a preset value, that is, determine whether the second preset times of cycles are completed. If the preset value is reached, step S522 is performed. If the preset value is not reached, step S530 is performed, that is, the process turns to step S306 in FIG. 3, that is, the value of the competition index in step S516 or S518 is output to perform step S306 in FIG. 3, so as to determine the number of the first terminals interfering with the terminals accessing the AP again. In this embodiment, the second preset times of cycles may be considered as the times being performed from step S510 to a step after S520, or be considered as threshold times of performing step S510. Step 520 may be understood as determining whether the performing times of step S510 reach the preset value.

Step S522: Determine whether a deployment scheme of the APs is saved. If it is determined that the deployment scheme of the APs is saved, step S526 is performed. If no deployment scheme of the APs is saved, step S524 is performed.

Step S524: Determine the second preset times of cycles are performed again. If the second preset times of cycles are not performed again, step S528 is performed. If the second preset times of cycles are performed again, step S526 is performed.

Step S528: Adjust a current value of the competition index to be 1, and perform the second preset times of cycles again. In this embodiment, the current times of cycles in step S520 is reset, and determined again.

After step S528 is performed, step S530 is performed.

Step S526: Output a result of the deployment scheme. In this embodiment, if the deployment scheme of the APs is saved, the deployment scheme of the APs is output. If no deployment scheme of the APs is saved, that is, no deployment scheme meets the access requirement, a result of no deployment scheme of the APs is output.

In the validation method according to the embodiment of the present invention, the channel distribution and the power control are performed on the APs in the deployment scheme, an AP is selected for a terminal, and then the selected AP is validated, so that the feasibility of the deployment scheme of the APs can be validated on one hand, and on the other hand, the competition model is adjusted by a validation result, therefore, the deployment scheme of the APs can meet the requirement of minimum cost.

Figure 6:
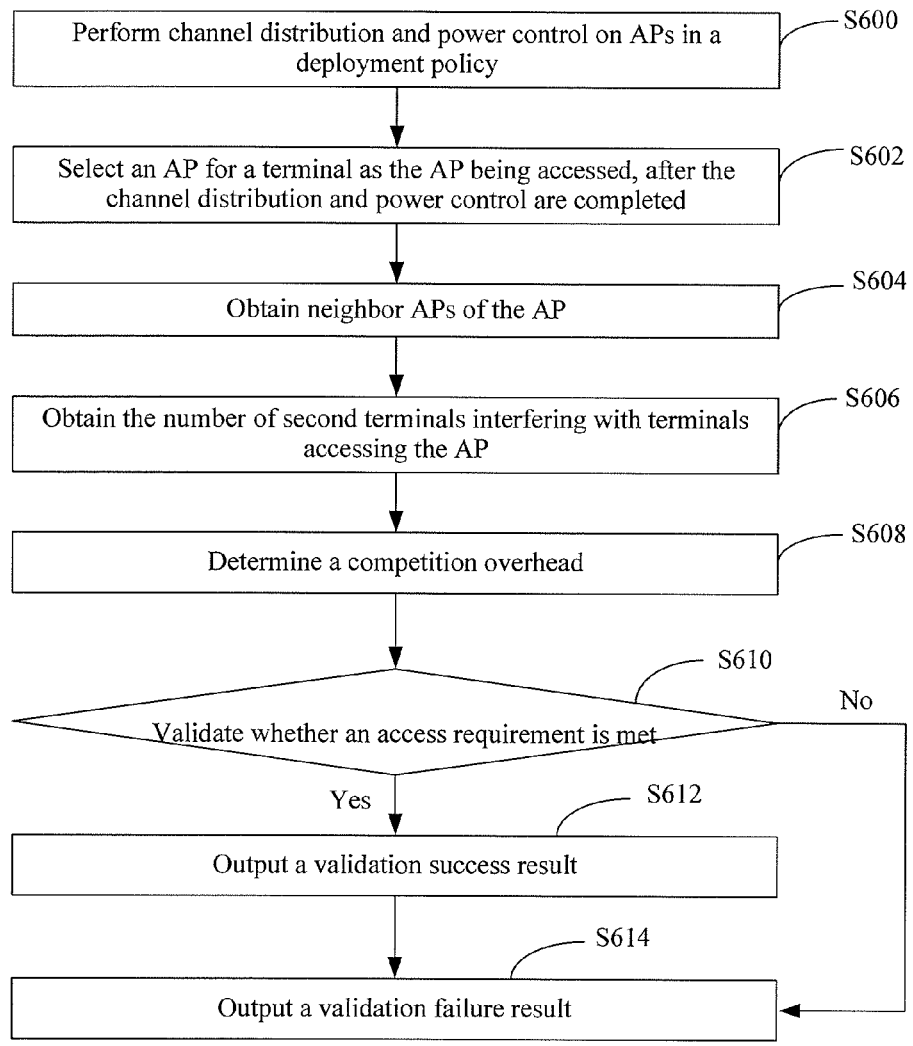
FIG. 6 is a specific flow chart of a method for validating a deployment scheme of APs in a second case according to an embodiment of the present invention.

FIG. 6 is a specific flow chart of a method for validating a deployment scheme of APs in a second case according to an embodiment of the present invention.

In this embodiment, steps S600, S602, S604, S606, S608, and S610 are respectively the same as steps S500, S502, S504, S506, S508, and S510 in FIG. 5, and are not repeated herein again.

In this embodiment, in step S610, if it is validated that the access requirement is met, step S612 is performed. If it is validated that the access requirement is not met, step S614 is performed.

Step S612: Output a validation success result, that is, output the deployment scheme of the APs passing the validation.

Step S614: Output a validation failure result.

In the validation method according to the embodiment of the present invention, the channel distribution and the power control are performed on the APs in the deployment scheme, an AP is selected for a terminal, and then the selected AP is validated, so as to validate the feasibility of the deployment scheme of the APs.

Figure 7:
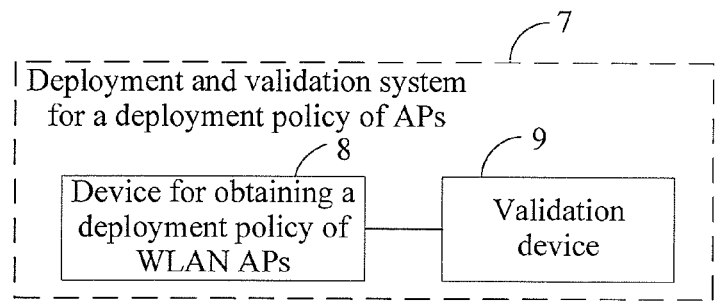
FIG. 7 is a schematic diagram of a system for obtaining and validating a deployment scheme of APs according to an embodiment of the present invention.

FIG. 7 is a schematic diagram of a system for obtaining and validating a deployment scheme of APs according to an embodiment of the present invention. In this embodiment, a deployment and validation system 7 includes a device 8 for obtaining a deployment scheme of WLAN APs, and a validation device 9. In this embodiment, the device 8 for obtaining the deployment scheme of the WLAN APs is configured to obtain coverage information of each AP according to a WLAN competition model and obtained deployment information, and combine a constraint relationship between the coverage information of each AP and cost information of each AP, and obtain the deployment scheme of the APs with a minimum deployment cost through calculation. In this embodiment, the validation device 9 is configured to validate the deployment scheme of the WLAN APs obtained by the device 8 for obtaining the deployment scheme of the WLAN APs. In this embodiment, the validation device 9 may be further configured to validate the deployment schemes of WALN APs obtained by other deployment devices.

Figure 8:
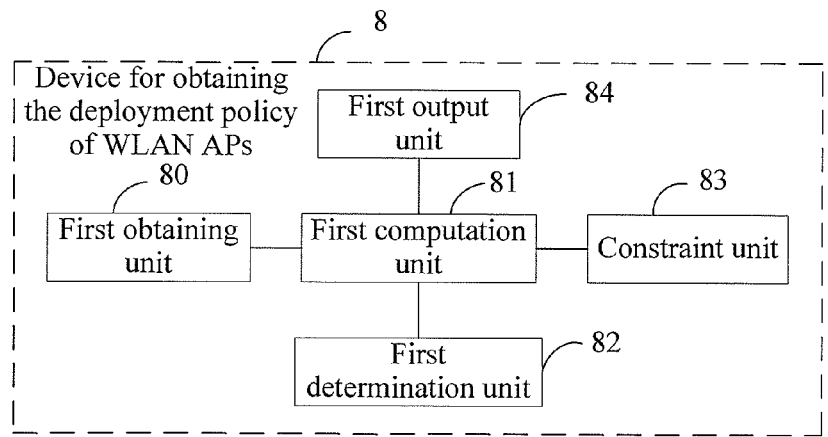
FIG. 8 is a structural diagram of a device for obtaining a deployment scheme of WLAN APs according to an embodiment of the present invention.

FIG. 8 is a structural diagram of a device for obtaining a deployment scheme of WLAN APs according to an embodiment of the present invention. In this embodiment, the device 8 includes a first obtaining unit 80, a first computation unit 81, a first determination unit 82, a constraint unit 83, and a first output unit 84. In this embodiment, the device for obtaining the deployment scheme of the WLAN APs may be a module or a unit deployed on other devices.

In this embodiment, the first obtaining unit 80 is configured to obtain deployment information. In this embodiment, the deployment information includes scenario information, apparatus specification information of multiple APs, a transmission model, user distribution information, and user requirement information. In this embodiment, as the APs have multiple apparatus specifications, each AP has a field intensity distribution, and coverage.

In this embodiment, the first obtaining unit 80 may be further configured to determine a rectangular mesh topology according to a scenario to be deployed, and determine whether each grid has a terminal and a size of a bandwidth required by the grid according to the user distribution, the user requirement and the mesh topology.

The first computation unit 81 is configured to determine a field intensity distribution according to the apparatus specifications and the scenario information in the deployment information. In this embodiment, the first computation unit 81 may determine the field intensity distribution of each AP according to each apparatus specification and the scenario information in the deployment information. The first computation unit 81 may calculate a signal attenuation value between any two grids through a selected transmission model, and weight a power in the apparatus specification and the signal attenuation value, to calculate the field intensity distribution of each grid, or it may also be understood as the field intensity distribution from the AP to each grid is obtained. In this embodiment, the field intensity distribution may also be referred to as signal intensity. In this embodiment, a corresponding relationship is also formed between the signal attenuation value and the bandwidth requirement. Therefore, the signal attenuation value may be obtained through the bandwidth requirement and the corresponding relationship, or the bandwidth requirement may be obtained through the signal attenuation value and the corresponding relationship.

In this embodiment, the first computation unit 81 is further configured to obtain coverage of the AP according to a WLAN competition model, the user distribution and the user requirement in the deployment information, and the field intensity distribution. In this embodiment, as the APs have multiple apparatus specifications and the field intensity distribution of each AP is obtained, the first computation unit 81 may obtain the coverage of each AP according to the WLAN competition model, the user distribution and the user requirement in the deployment information, and the field intensity distribution of each AP.

In this embodiment, description is made with reference to the obtaining of an AP having a certain apparatus specification among the APs having multiple apparatus specifications.

In this embodiment, the first computation unit 81 is further configured to determine the number of terminals accessing the AP by adjusting an upper limit and a lower limit of the field intensity covered by the AP, and according to the user distribution and the user requirement in the deployment information. In addition, the first computation unit 81 is further configured to adjust the upper limit and the lower limit of the field intensity covered by the AP, determine whether each grid has a terminal according to the user distribution in the deployment information and the mesh topology, and determine the number of the terminals accessing the AP according to bandwidth requirement of the terminal in the grid and an average value of the upper limit and the lower limit of the field intensity covered by the AP when each grid has a terminal.

In this embodiment, the first computation unit 81 is further configured to determine the number of terminals interfering with the terminals accessing the AP. In this embodiment, the number of the first terminals interfering with the terminals accessing the AP may be determined according to a WLAN competition model, the number of the terminals accessing the AP, and the number of terminals in an interference range of the AP. In this embodiment, the number of the terminals in the interference range of the AP includes two parts. One part is the number of terminals in a 1× interference range of the AP and the other part is the number of terminals in a 2× interference range of the AP, in which the interference range may be determined by a power and an attenuation degree of the AP. The interference range can be understood and obtained by persons skilled in the art. In this embodiment, The WLAN competition model may be expressed by an inequation below:

$$\sum_{sta_i \in STA(n1)} \frac{d_{sta_i}}{b_{sta_i}} \leq \left(\frac{n1}{n}\right)^{\alpha} (1 - \text{Cost}(n)).$$

In this embodiment, $\alpha$ is an adjustment parameter, and may have different values, $d_{sta_i}$ represents a bandwidth requirement of a terminal accessing an AP, $b_{sta_i}$ represents a maximum bandwidth requirement from the terminal i accessing the AP to the AP, in which the maximum bandwidth requirement from the terminal i to the AP may be understood as a maximum bandwidth provided by the AP for the terminal i, that is, a maximum field intensity distribution from the AP to a grid in which the terminal accessing the AP resides, n represents the number of the first terminals interfering with the terminals accessing the AP, Cost(n) represents a competition overhead, and n1 represents the number of the terminals accessing the AP.

In this embodiment, $\alpha$ may have different values. When a has different values, a value of the number of the first terminals interfering with the terminals accessing the AP is influenced. The following formulas exist:

if $\alpha < 1, n = n1/(n1/n2)^{\alpha}$; and if $\alpha \geq 1, n = n1/(n1/n3)^{\alpha - 1}$, in which n represents the number of the first terminals interfering with the terminals accessing the AP, n1 represents the number of the terminals accessing the AP, n2 represents the number of the terminals in the 1× interference range of the AP, and n3 represents the number of the terminals in the 2× interference range of the AP.

In this embodiment, the first computation unit 81 is further configured to determine a coverage according to the number of the first terminals, the bandwidth requirements of the terminals accessing the AP, and the field intensity distribution. In addition, in this embodiment, the first computation unit 81 is further configured to determine a coverage threshold value of the AP according to the number of the first terminals interfering with the terminals accessing the AP, the bandwidth requirements of the terminals accessing the AP, and the field intensity distribution, and determine the coverage according to the coverage threshold value and the field intensity distribution. The first computation unit 81 is further configured to determine a competition overhead according to the number of the first terminals interfering with the terminals accessing AP.

The first determination unit 82 is configured to validate whether an access requirement is met. In this embodiment, the first determination unit 82 may validate whether the access requirement is met according to the competition overhead, the bandwidth requirements of the terminals accessing the AP, and the field intensity distribution from the AP to grids in which the terminals accessing the AP reside.

The first computation unit 81 is further configured to adjust the upper limit of the field intensity when it is validated that the access requirement is met, or adjust the lower limit of the field intensity when it is validated that the access requirement is not met.

The first determination unit 82 is further configured to determine whether K times of cycles are completed, and when it is determined that the K times of cycles are completed, an upper limit currently obtained by the first computation unit 81 is used as the coverage threshold value of the AP.

The first computation unit 81 is further configured to determine the coverage according to the coverage threshold value and the field intensity distribution.

The constraint unit 83 is configured to establish a constraint according to cost information in the apparatus specifications, and the coverage. In this embodiment, a linear constraint of a target function is established according to the cost information in the apparatus specification, and a linear constraint of the coverage is established according to the coverage. In this embodiment, an apparatus position linear constraint and a gateway position liner constraint may be further established. In this embodiment, the constraint between the coverage and the cost information of the AP may be described through linear programming, and the constraint between the coverage and the cost information of the AP may also be described by the graph theory. Definitely, a simplex algorithm in operational research may also be used.

The first computation unit 81 is further configured to calculate the constraint established in the constraint unit 83, so as to obtain a deployment scheme of the APs with a minimum deployment cost. In this embodiment, each AP has a constraint relationship, and after each grid h meets the constraint relationship of the coverage, the deployment cost brought by the APs having the g apparatus specification is obtained in the presence of such a constraint, and then the deployment scheme of the APs with the minimum deployment cost is obtained.

The first output unit 84 is configured to output the deployment scheme of the WLAN APs obtained by the first computation unit 81.

In this embodiment, the first output unit 84 is further configured to output the WLAN competition model used in the first computation unit 81, that is, output the value of $\alpha$ used in the first computation unit 81.

By using the device for obtaining the deployment scheme of the WLAN APs according to the embodiment of the present invention, the number of the first terminals interfering with the terminals accessing the AP is obtained according to the obtained deployment information, the coverage threshold value of the AP is obtained according to the number of the first terminals, the bandwidth requirements of the terminals accessing the AP, and the field intensity distribution, the coverage is obtained according to the coverage threshold value and the field intensity distribution, and then linear programming is performed according to the apparatus cost information and the coverage, so as to obtain the deployment scheme of the WLAN APs. Compared with the prior art, no manual adjustment is required in obtaining of the deployment scheme of the WLAN APs, so that automatic obtaining of the deployment scheme of the APs can be achieved; and in obtaining of the deployment scheme of the WLAN APs, the constraint between the cost information of each AP and the coverage of the each AP is established, so that the cost needed by the entire deployment can be controlled, and the deployment scheme of the APs with the minimum total deployment cost is obtained.

Figure 9:
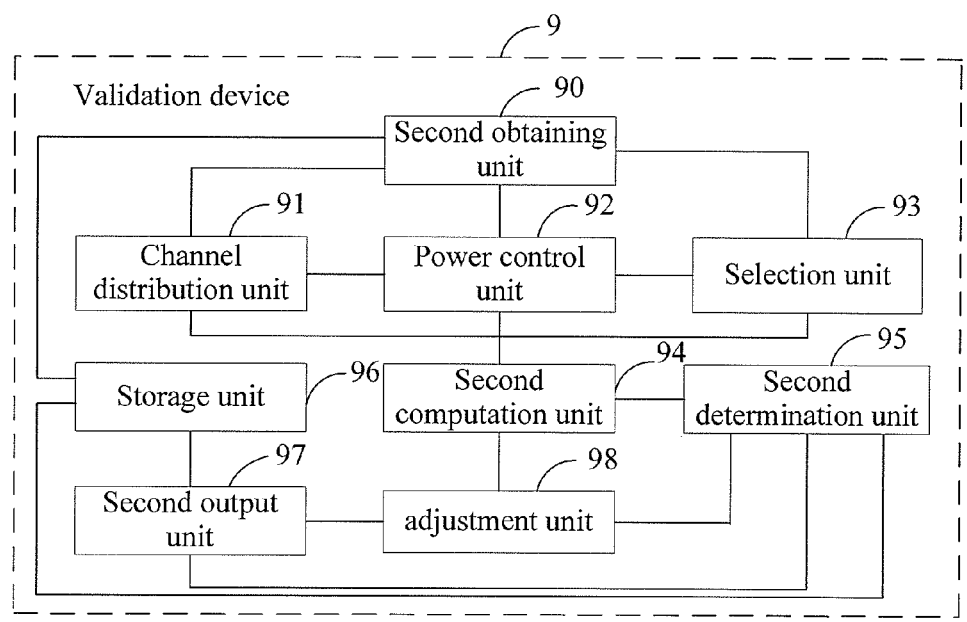
FIG. 9 is a structural diagram of a validation device according to an embodiment of the present invention.

FIG. 9 is a structural diagram of a validation device according to an embodiment of the present invention. In this embodiment, a validation device 9 includes a second obtaining unit 90, a channel distribution unit 91, a power control unit 92, a selection unit 93, a second computation unit 94, a second determination unit 95, a storage unit 96, a second output unit 97, and an adjustment unit 98.

In this embodiment, the second obtaining unit 90 is configured to obtain the deployment scheme of the WLAN APs output from the device 8 for obtaining the deployment scheme of the WLAN APs. In this embodiment, the second obtaining unit 90 is further configured to obtain a WLAN competition model in the device 8 for obtaining the deployment scheme of the WLAN APs, that is, obtain a value of $\alpha$ used in the device 8 for obtaining the deployment scheme of the WLAN APs.

The channel distribution unit 91 is configured to perform channel distribution on the APs in the deployment scheme obtained by the second obtaining unit 90. In this embodiment, a channel distribution algorithm is mainly to select a channel with a minimum signal intensity for each AP as a working channel according to a collected signal intensity scanned for the APs in the entire network.

The power control unit 92 is configured to perform power control on the APs in the deployment scheme obtained by the second obtaining unit 90. In this embodiment, a power control algorithm is mainly to turn down the power of one or more APs according to interference information of APs in the entire network, in which a coverage requirement must be ensured in the turn-down process.

The selection unit 93 is configured to select an AP for a terminal as the AP being accessed, after the channel distribution and power control are completed by the channel distribution unit 91 and the power control unit 92 respectively. In this embodiment, any AP selection algorithm may be used to select an AP for a terminal as the AP being accessed. The AP selection algorithm is mainly that the terminal selects whether to access an AP according to a received AP signal intensity, and a payload of the AP, in which the terminal selects multiple APs based on the signal intensities first, and then selects an AP with a minimum payload to be accessed according to the payloads of the APs.

The second computation unit 94 is configured to obtain neighbor APs of the AP selected by the selection unit 93. In this embodiment, all neighbor APs working on the same channel with the AP are obtained in an interference range of the AP. In this embodiment, the second computation unit 94 is further configured to obtain the number of second terminals interfering with terminals accessing the AP. In this embodiment, the number of terminals accessing all the neighbor APs of the AP and the number of terminals accessing the AP are obtained first, and the number of the terminals accessing all the neighbor APs of the AP and the number of the terminals accessing the AP are weighted, to obtain the number of the second terminals interfering with the terminals accessing the AP. In this embodiment, the second computation unit 94 is further configured to determine a competition overhead. In this embodiment, the competition overhead may be determined according to the number of the second terminals interfering with the terminals accessing the AP.

The second determination unit 95 is configured to validate whether an access requirement is met. In this embodiment, it is validated whether the access requirement is met according to the competition overhead, and bandwidth requirements of the terminals accessing the AP.

The adjustment unit 98 is configured to adjust a value of a competition index $\alpha$ in the WLAN competition model when the second determination unit 95 validates that the access requirement is not met. In this embodiment, current times of cycles d being performed are obtained, and the value of the competition index is increased by $\frac{1}{2}^{d-1}$. In this embodiment, the current times of cycles being performed may be understood as the validation times by which the second determination unit 95 validates whether the access requirement is met.

The second determination unit 95 is configured to instruct the storage unit 96 to save the deployment scheme of the APs obtained by the second obtaining unit 90 when it is validated that the access requirement is met, and determine whether the value of the competition index $\alpha$ in the WLAN competition model is 0.

The storage unit 96 is configured to save the deployment scheme of the APs obtained by the second obtaining unit 90 when the second determination unit 95 validates that the access requirement is met.

The adjustment unit 98 is further configured to adjust the value of the competition index $\alpha$ in the WLAN competition model when the second determination unit 95 determines that the value of the competition index $\alpha$ in the WLAN competition model is 0. In this embodiment, the current times of cycles d being performed are obtained, and the competition index is reduced by $\frac{1}{2}^{d-1}$.

The second determination unit 95 is further configured to determine whether the current times of cycles d being performed reach a preset value after the adjustment unit 98 adjusts the competition index $\alpha$. In this embodiment, after determining that the current times of cycles d being performed reaches the preset value, the second determination unit 95 notifies the second output unit 97 to output the deployment scheme of the APs saved in the storage unit 96. After determining that the current times of cycles d being performed does not reach the preset value, the second determination unit 95 notifies the device 8 for obtaining the deployment scheme of the WLAN APs to reset the value of the competition index, and notifies the second output unit 97 to output the value of the competition index adjusted by the adjustment unit 98 to the device 8 for obtaining the deployment scheme of the WLAN APs.

The second determination unit 95 is further configured to determine whether a deployment scheme of the APs is saved in the storage unit 96 if it is determined that the current times of cycles d being performed reach the preset value. In this embodiment, the second determination unit 95 is further configured to determine whether second preset times of cycles are performed again if it is determined that no deployment scheme of APs is saved. The second determination unit 95 is further configured to instruct the adjustment unit 98 to adjust a current value of the competition index to be 1 if the second preset times of cycles are not performed again, and determine again whether the current times of cycles d being performed reach the preset value.

The second output unit 97 is configured to output the deployment scheme of the APs saved in the storage unit 96 when the second determination unit 95 determines that the deployment scheme of the APs is saved in the storage unit 96, or determines that the second preset times of cycles are performed again. If the deployment scheme of the APs is saved in the storage unit 96, the latest deployment scheme of the APs is output. If no deployment scheme of the APs is saved in the storage unit 96, a result of no deployment scheme of the APs is output, or it may be considered that the deployment scheme of the APs in the device 8 for obtaining the deployment scheme of the WLAN APs is incorrect, or improper.

The second output unit 97 is further configured to output the value of the competition index adjusted by the adjustment unit 98 to the device 8 for obtaining the deployment scheme of the WLAN APs if the second determination unit 95 determines that the current times of cycles d being performed does not reach the preset value.

In the validation method according to the embodiment of the present invention, the channel distribution and the power control are performed on the APs in the deployment scheme, an AP is selected for a terminal, and then the selected AP is validated, so that the feasibility of the deployment scheme of the APs can be validated on one hand, and on the other hand, the competition model is adjusted by a validation result, and therefore, the deployment scheme of the APs can meet the requirement of a minimum cost.

Figure 10:
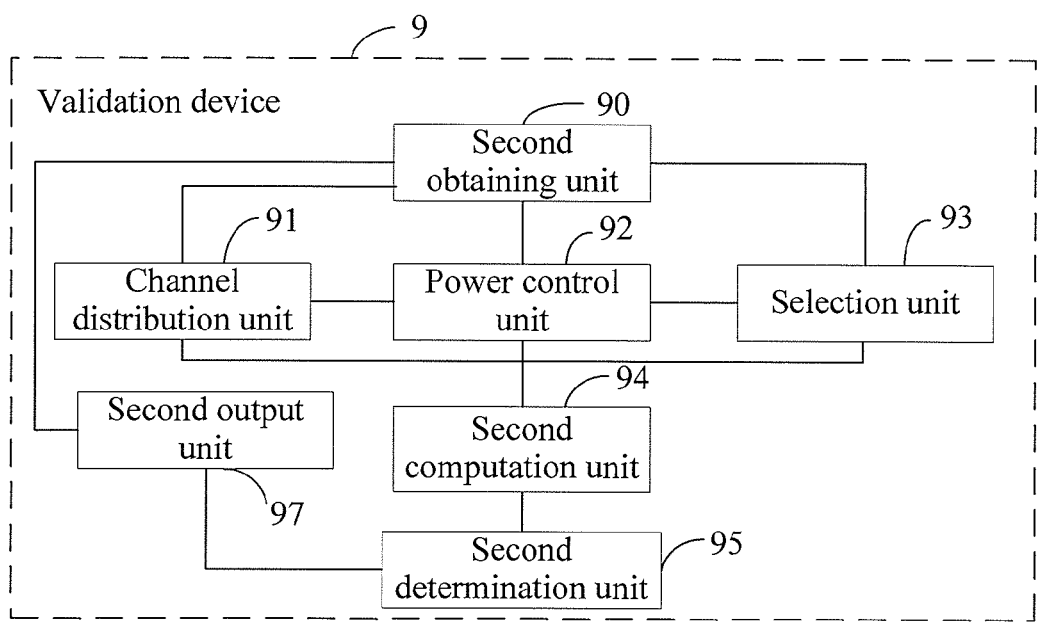
FIG. 10 is another structural diagram of a validation device according to an embodiment of the present invention.

FIG. 10 is another structural diagram of a validation device according to an embodiment of the present invention. In this embodiment, differences between FIG. 10 and FIG. 9 lie in that the structural diagram of the validation device shown in FIG. 10 does not include the adjustment unit 98 and the storage unit 96, and through FIG. 10, not only the deployment scheme of the WLAN APs in the device 8 for obtaining the deployment scheme of the WLAN APs according to the embodiment of the present invention can be validated, but also deployment policies of the WLAN APs obtained or generated by other deployment devices can be validated. In an implementation process, the validation device as shown in FIG. 10 does not need to adjust the competition index, and only needs to validate whether the obtained deployment scheme of the WLAN APs is proper, or meets the access requirement.

In FIG. 10, when the second determination unit 95 validates that the access requirement is met, the second output unit 97 directly outputs a result that the validation is passed or successful, that is, outputs the deployment scheme of the WLAN APs obtained by the second obtaining unit 90. If the second determination unit 95 validates that the access requirement is not met, the second output unit 97 directly outputs a result that the validation is not passed or unsuccessful. Functions of other units are the same as those of the same units in FIG. 9, and are not further described herein again.

In the validation method according to the embodiment of the present invention, the channel distribution and the power control are performed on the APs in the deployment scheme, an AP is selected for a terminal, and then the selected AP is validated, so as to validate the feasibility of the deployment scheme of the APs.

Persons of ordinary skill in the art should understand that, all or a part of processes in the method according to the embodiments may be implemented by a computer program instructing relevant hardware. The program may be stored in a computer-readable storage medium. When the program is run, the processes of the method according to the embodiments of the present invention are performed. The storage medium may be a magnetic disk, an optical disk, a read-only memory (ROM), a random access memory (RAM), and the like.

What is claimed is:

1. A method for obtaining a deployment scheme of Wireless Local Area Network (WLAN) Access Points (APs), the method comprising:
    obtaining coverage information of each AP according to a WLAN competition model and deployment information;
    obtaining the deployment scheme of the APs by calculating a constraint relationship; and
    wherein the constraint relationship is combined between the coverage information of each AP and cost information of each AP and comprises:
        describing the constraint relationship between the coverage information of each AP and the cost information of each AP by linear programming, or
        describing the constraint relationship between the coverage information of each AP and the cost information of each AP by graph theory.

2. The method according to claim 1, wherein the deployment information comprises a scenario, apparatus specifications of the APs, user distribution, and user requirements, and the obtaining the coverage of each AP according to the WLAN competition model and the deployment information comprises:
    determining a field intensity distribution of each AP according to the scenario and the apparatus specification of each AP in the deployment information; and
    obtaining the coverage of each AP according to the WLAN competition model, the user distribution and the user requirement of each AP in the deployment information, and the field intensity distribution of each AP.

3. The method according to claim 2, wherein the determining the field intensity distribution of each AP according to the scenario and the apparatus specification of each AP in the obtained deployment information comprises:
    determining a rectangular mesh topology according to the scenario to be deployed;
    calculating a signal attenuation value between any two grids in the mesh topology through a selected transmission model; and
    obtaining a field intensity distribution from each AP to each grid through calculation according to a power in the apparatus specification of each AP and the signal attenuation value.

4. The method according to claim 2, wherein the obtaining the coverage of each AP according to the WLAN competition model, the user distribution and the user requirements in the deployment information, and the field intensity distribution of each AP comprises:

determining the number of terminals accessing each AP by adjusting an upper limit or a lower limit of the coverage field intensity of each AP, and according to the user distribution and the user requirements in the deployment information;

obtaining the number of first terminals interfering with the terminals accessing each AP according to the WLAN competition model, the number of the terminals accessing each AP, and the number of terminals in an interference range of each AP; and determining the coverage of each AP according to the number of the first terminals, bandwidth requirements of the terminals accessing the AP, and the field intensity distribution.

5. The method according to claim 4, wherein the determining the coverage of each AP according to the number of the first terminals, the bandwidth requirements of the terminals accessing the AP, and the field intensity distribution comprises:

determining a coverage threshold value of each AP according to the number of the first terminals interfering with the terminals accessing the AP, the bandwidth requirements of the terminals accessing the AP, and the field intensity distribution; and determining the coverage of each AP according to the coverage threshold value and the field intensity distribution of each AP.

6. The method according to claim 5, wherein the determining the coverage threshold value of each AP according to the number of the first terminals interfering with the terminals accessing each AP, the bandwidth requirements of the terminals accessing the AP, and the field intensity distribution comprises:

determining a competition overhead according to the number of the first terminals interfering with the terminals accessing AP; and determining the coverage threshold value of each AP according to the competition overhead, the bandwidth requirements of the terminals accessing the AP, and the field intensity distribution.

7. The method according to claim 6, wherein the determining the coverage threshold value of each AP according to the competition overhead, the bandwidth requirements of the terminals accessing the AP, and the field intensity distribution comprises:

validating whether the AP meets an access requirement according to the competition overhead, the bandwidth requirements of the terminals accessing the AP, and the field intensity distributions from the AP to the grids in which the terminals accessing the AP reside;

adjusting the upper limit of the field intensity if the AP meets the access requirement, and adjusting the lower limit of the field intensity if the AP does not meet the access requirement;

performing the foregoing steps for a first preset times of cycles; and using the adjusted upper limit value of the field intensity as the coverage threshold value of each AP after the first preset times of cycles are completed.

8. The method according to claim 1, further comprising: validating the deployment scheme of the APs.

9. The method according to claim 8, wherein the validating the deployment scheme of the APs comprises:

performing channel distribution and power control on the AP in the deployment scheme;

selecting an AP to be accessed for terminals;

validating whether the AP meets the access requirement; and outputting a validation result.

10. The method according to claim 9, wherein the validating whether the AP meets the access requirement comprises:

obtaining neighbor APs of the selected AP;

obtaining the number of second terminals interfering with the terminals accessing the AP;

determining a competition overhead according to the number of the second terminals interfering with the terminals accessing the AP; and validating whether the AP meets the access requirement according to the competition overhead, the bandwidth requirements of the terminals accessing the AP, and the field intensity distributions from the AP to the grids in which the terminals accessing the AP reside.

11. The method according to claim 10, wherein the neighbor APs are in the interference range of the selected AP and work on the same channel with the selected AP, and the obtaining the number of the second terminals interfering with the terminals accessing the AP comprises:

obtaining the number of terminals accessing all neighbor APs of the AP and the number of terminals accessing the AP; and obtaining the number of the second terminals interfering with the terminals accessing the AP by calculating the number of the terminals accessing all the neighbor APs of the AP and the number of the terminals accessing the AP.

12. The method according to claim 9, wherein the validating whether the AP meets the access requirement further comprises:

saving the current deployment scheme of the APs if it is validated that the AP meets the access requirement;

determining whether a competition index in the WLAN competition model is zero;

decreasing a value of a current competition index, and determining whether a second preset times of cycles are completed if a value of the competition index is not zero; or outputting a saved current deployment scheme of the APs if the value of the competition index is zero.

13. The method according to claim 12, wherein the determining whether the second preset times of cycles are completed comprises:

outputting the saved deployment scheme of the APs if the second preset times of cycles are completed; and performing the obtaining of the coverage of each AP according to the WLAN competition model, the user distribution and the user requirements in the deployment information, and the field intensity distribution of each AP, if the second preset times of cycles are not completed.

14. The method according to claim 9, wherein the validating whether the AP meets the access requirement further comprises:

increasing the value of the current competition index if it is validated that the AP does not meet the access requirement; and determining whether the performing of the second preset times of cycles is completed in the foregoing steps.

15. A system for obtaining and validating a deployment scheme of Wireless Local Area Network (WLAN) Access Points (APs), the system comprising:

a device for obtaining a deployment scheme of WLAN APs and configured to:
  obtain coverage information of each AP according to a WLAN competition model and obtained deployment information, and
  obtain the deployment scheme of the APs by calculating a constraint relationship, wherein the constraint relationship is combined between the coverage information of each AP and cost information of each AP and comprises:
    describing the constraint relationship between the coverage information of each AP and the cost information of each AP by linear programming, or
    describing the constraint relationship between the coverage information of each AP and the cost information of each AP by graph theory; and
  a validation device, configured to validate the access requirement of the deployment scheme of the APs.

16. The system according to claim 15, wherein the deployment information includes a scenario, apparatus specifications of the APs, a user distribution, and user requirements, and the device for obtaining the deployment scheme of the WLAN APs is further configured to determine a field intensity distribution of each AP according to the scenario and the apparatus specification of each AP in the deployment information, and obtain coverage of each AP according to the WLAN competition model, the user distribution and the user requirements in the deployment information, and the field intensity distribution of each AP.

17. The system according to claim 16, wherein the deployment scheme of the APs comprises a position, a bandwidth requirement, and a coverage range of an AP, a field intensity distribution from the AP to each grid, a cost and the WLAN competition model, and the validation device is further configured to save a current deployment scheme of the APs when it is validated that an access requirement is met, and determine a value of a competition index in the WLAN competition model.

18. The system according to claim 17, wherein the validation device is further configured to adjust a value of the current competition index when the value of the competition index is not 0 or when it is validated that an access requirement is not met, and determine whether first preset times of cycles are completed.

19. The system according to claim 18, wherein the validation device is further configured to output the saved current deployment scheme of the APs when the value of the competition index is 0 or the first preset times of cycles are completed.

20. A device for obtaining a deployment scheme of Wireless Local Area Network (WLAN) Access Points (APs), the device comprising:
  a first obtaining unit, configured to obtain coverage information of each AP according to a WLAN competition model and obtained deployment information, and
  a second obtaining unit, configured to obtain the deployment scheme of the APs by calculating a constraint relationship, wherein the constraint relationship is combined between the coverage information of each AP and cost information of each AP and comprises:
    describing the constraint relationship between the coverage information of each AP and the cost information of each AP by linear programming, or
    describing the constraint relationship between the coverage information of each AP and the cost information of each AP by the graph theory.

* * * * *